(12) United States Patent
Emick (10) Patent No.: US 9,597,544 B1
(45) Date of Patent: Mar. 21, 2017

(54) CONNECTOR FOR WEIGHT PLATE HOLDER WITH OPTIONAL DUMBBELL HOLDER

(71) Applicant: Daniel W. Emick, Montoursville, PA (US)

(72) Inventor: Daniel W. Emick, Montoursville, PA (US)

(*) Notice: Subject to any disclaimer, the term of this patent is extended or adjusted under 35 U.S.C. 154(b) by 0 days.

(21) Appl. No.: 15/157,818

(22) Filed: May 18, 2016

(51) Int. Cl.
| | | |
|---|---|---|
| *F16M 11/00* | (2006.01) | |
| *A63B 21/072* | (2006.01) | |
| *F16M 11/42* | (2006.01) | |
| *F16M 11/18* | (2006.01) | |
| *F16M 11/04* | (2006.01) | |
| *F16M 11/10* | (2006.01) | |

(52) U.S. Cl.
CPC ....... *A63B 21/0728* (2013.01); *F16M 11/041* (2013.01); *F16M 11/046* (2013.01); *F16M 11/10* (2013.01); *F16M 11/18* (2013.01); *F16M 11/42* (2013.01)

(58) Field of Classification Search
USPC ..................................................... 248/125.2
See application file for complete search history.

(56) References Cited

U.S. PATENT DOCUMENTS

| | | | | |
|---|---|---|---|---|
| 4,438,920 A | * | 3/1984 | Veillette | A63B 23/14 482/46 |
| 4,717,147 A | * | 1/1988 | Rochelle | A63B 21/0724 294/15 |
| 4,741,528 A | * | 5/1988 | Church | A63B 21/154 124/23.1 |
| 5,209,481 A | * | 5/1993 | DeBack | A63B 21/0004 473/220 |
| 6,030,323 A | * | 2/2000 | Fontenot | A63B 21/0083 482/111 |
| 6,689,022 B1 | * | 2/2004 | Emick | A63B 21/06 482/93 |
| D653,715 S | * | 2/2012 | Tumminia | D21/662 |

(Continued)

*Primary Examiner* — Monica Millner
(74) *Attorney, Agent, or Firm* — Thomas R. Shaffer (57) ABSTRACT

A connector for a weight plate holder of the type having a weight plate base and attached a vertical upright member upon which weight plates can be stacked is provided. The vertical upright member has at least one hole therein. A connection plate having a first end, a second end and a middle portion between said first end and said second end is provided. The first end has a cable opening therein to allow a cable to be connected. The middle portion has a central opening therein sized larger than the vertical upright member and also has a lock tab protruding partially into the central opening. The connection plate will slide over and onto said vertical upright member when it is a horizontal orientation but when the first end is tipped upwardly away from a horizontal orientation, the lock tab enters a hole in the upright member. Pulling upwardly on the first end keeps the lock tab firmly held in the upright hole allowing the connection plate and attached weight plate holder to be lifted by a cable attached to the cable opening. Preferably, the second end has a hook connector to which spaced apart hooks are pivotally mounted. The hooks wrap around and hold a central bar of a dumbbell and allow the hooks to lift the dumbbell by lifting a cable attached to the cable opening.

15 Claims, 9 Drawing Sheets

(56) References Cited

U.S. PATENT DOCUMENTS

| | | | |
|---|---|---|---|
| 8,834,330 B1* | 9/2014 | Morales | A63B 21/0605 |
| | | | 482/107 |
| 9,498,676 B1* | 11/2016 | Emick | A63B 23/04 |
| 2007/0249472 A1* | 10/2007 | Frei | A45B 1/02 |
| | | | 482/66 |
| 2010/0029447 A1* | 2/2010 | Song | A63B 21/06 |
| | | | 482/93 |
| 2010/0190619 A1* | 7/2010 | Chen | A63B 21/0728 |
| | | | 482/108 |
| 2014/0057764 A1* | 2/2014 | Klukas | A63B 15/00 |
| | | | 482/109 |
| 2015/0174445 A1* | 6/2015 | Robertson, Jr. | A63B 23/0405 |
| | | | 482/93 |

* cited by examiner

CONNECTOR FOR WEIGHT PLATE HOLDER WITH OPTIONAL DUMBBELL HOLDER

BACKGROUND OF THE INVENTION

1. Field of the Invention

The present invention relates to a connector for a weight plate holder and optional dumbbell holder. More specifically it relates to a connection plate having a cable connection at a first end and central opening therein sized larger than a weight plate holder vertical upright member for lifting a weight plate holder and preferably also having a pair of hooks pivotally connected to a second end for lifting a dumbbell.

2. Description of the Prior Art

Two of the most popular "body weight" exercises are Dips for strengthening the chest and triceps and Pull ups for strengthening the back. Dips are performed with the exerciser grasping parallel bars on opposite sides of the exerciser's torso with the exerciser lifting and lowering his/her body with the arms. Pull ups are performed with the exerciser grasping a bar above the exerciser's head and pulling his/her body upwardly and downwardly with the arms. Although each of these exercises is highly effective, they are limited in ability to strengthen and cannot create a level of strength greater than that needed to move the exerciser's bodyweight throughout the exercise range of motion for a given number of repetitions. For increased strengthening, the dictates of resistance exercise require ever increasing loads to be placed against muscle in order to achieve ever increasing levels of adaptive benefits. In regards to Dips and Pull Up exercise progression beyond that limited by body weight resistance, the exerciser must find a means of adding to body's weight.

The most common accepted means of adding additional weight for enhanced Dips & Pull Ups training is achieved by affixing a common dipping belt around the midsection of a user's body from which a chain suspends to be fished through a hole in a weight plate, or snap hooked to a traditional weight plate holder in the form of a base disc (on which the weight plates rest) with a centered vertical upright or riser shaft and ring at top. A more recent means of applying resistance to common dipping belts is through use of a dumbbell hook with attached ring through which the chain can be inserted to suspend the dumbbell. The hook cradles the dumbbell as suspended from the dipping belt for the duration of the exercise.

SUMMARY OF THE INVENTION

Existing devices provide exercisers the means of utilizing two types of weight with a dipping belt, namely, weight plates and dumbbells. However, prior to the present invention, exercisers have never been offered the dual function which the preferred embodiment of the present invention provides in the form of a connector which combines a weight plate holder and a dumbbell holder in a single device. An additional benefit is that unlike existing devices which require removal of a snap hook from a riser shaft ring to add or remove weights, the present invention makes weight plate changes as easy as releasing suspension cable tension, leveling a connection plate and removing. Once the weight plate holder is loaded with the desired number and weight of weight plates, the connection plate is simply dropped over a vertical upright member of the weight plate holder and when a first end of the connection plate is tilted upwardly, a lock tab engages into a hole in the vertical upright member of the weight plate holder. The lock tab will instantly and securely lock in place when upward tension is re-applied to the cable. An additional feature of the present invention is the provision of wheels on the weight plate holder base so that the device can be quickly and easily rolled to and from weight tree's for loading and unloading.

In its simplest form, the present invention provides a connector for a weight plate holder of the type having a weight plate base and attached vertical upright member upon which weight plates can be stacked, said vertical upright member having at least one hole therein comprising: a connection plate, said connection plate having first end and second end and a middle portion between said first end and said second end, said first end having a cable opening therein to allow the connection of a cable thereto, said middle portion having a central opening therein sized larger than said vertical upright member, said middle portion also having a lock tab protruding partially into said central opening whereby said connection plate will slide over and onto said vertical upright member when said connection plate is in a horizontal orientation and when said first end of said connection plate is tipped upwardly away from a horizontal orientation said lock tab enters said at least one hole whereby pulling upwardly on said first end keeps said lock tab firmly held in said at least one hole allowing the connection plate and attached weight plate holder to be lifted by a cable attached to said cable opening.

Preferably, said lock tab is located along a longitudinal centerline of the connection plate.

Preferably, said cable opening in located along a longitudinal centerline of the connection plate.

Preferably, said opening is about 0.4 cm. longer in longitudinal direction than a corresponding dimension of the vertical upright member.

Preferably, said connection plate is generally rectangular and said first end is generally triangular with said cable opening located in the triangular first end.

Preferably, said central opening is generally square but technically rectangular with a length dimension slightly larger than a width dimension of said vertical upright member having a square cross sectional configuration.

In one alternate embodiment of the invention, said central opening is generally circular but technically ovoid with a length dimension slightly larger than the diameter of said vertical upright member having a circular cross sectional configuration.

Preferably, pulling upwardly on said first end of said connection plate applies torque and creates friction on edges of open adjacent said first end and said second end of said connection plate which aid in securing the connection plate onto said upright member of said weight plate holder.

Preferably, said connection plate is positioned at an angle B of approximately 20 degrees from a horizontal orientation when in a tilted locked position.

Preferably, said connection plate has a length of about 10 cm. a width of about 6 cm. and a thickness of about 0.6 cm.

Preferably, said connection plate has a generally square central opening of about 4.0 cm. by 4.1 cm with a lock tab which has a length of about 0.3 cm. for use of a vertical upright member having outer dimensions of about 3.7 cm by 3.7 cm.

Preferably, said connection plate also provides a dumbbell holder for a dumbbell having a central bar wherein the weight plate holder further comprising: said second end having a hook connector thereon; and spaced apart hooks pivotally mounted to said hook connector whereby said hooks will wrap around and hold a central bar of a dumbbell to allow the hooks to lift said dumbbell by lifting a cable attached to said cable opening.

Preferably, said spaced apart hooks are provided on a single lifting hook member, said lifting hook member having a central portion and a pair of hooks, with one hook attached at each opposite end of said central portion, each hook having an angled portion extending inwardly toward a back side of said connection plate, a downwardly extending portion, and an arcuate portion having an approximate midpoint positioned on a line of pull, whereby a bar positioned on said pair of hooks will remain at the approximate midpoint of said arcuate portions when lifted by said pair of hooks.

Preferably, said hook connection further comprises plural rings attached to said second end of said connection plate through which a central portion of single hook passes allowing pivotal rotation of hook ends of said single lifting hook.

Preferably, said weight plate base has wheels to allow the weight plate holder to be easily rolled from location to location.

These and other features and benefits of the present invention will be more fully described and shown in the figures and detailed description of the preferred embodiments of the invention which follow.

DETAILED DESCRIPTION OF THE PREFERRED EMBODIMENTS

Referring to FIGS. 1 through 8, the connector 1 of the present invention is utilized to connect to a weight plate holder 2 of the type having a weight plate base 4 and attached vertical upright member 6 upon which weight plates 8 can be stacked. The vertical upright member 6 has at least one hole 10 therein. The connector 1 comprises a connection plate 20 which has a first end 30, a second end 40 and a middle portion 50 between the first end 30 and the second end 40. The first end 30 of the connection plate 20 has a cable opening 32 therein to allow the connection of a cable 34 thereto. The middle portion 50 of the connection plate 20 has a central opening 60 therein sized slightly larger than the vertical upright member 6. The middle portion 50 also has a lock tab 70 protruding partially into said central opening 60 whereby said connection plate 20 will slide over an onto said vertical upright member 6 when said connection plate 20 is in a horizontal orientation and when said first end 30 of said connection plate 20 is tipped upwardly away from a horizontal orientation, said lock tab 70 enters said at least one hole 10 whereby pulling upwardly on said first end 30 keeps the lock tab 70 firmly held in said at least one hole 10. This allows the connection plate 20 and the attached weight plate holder 2 to be lifted by a cable 34 attached to said cable opening 32.

Figure 2:
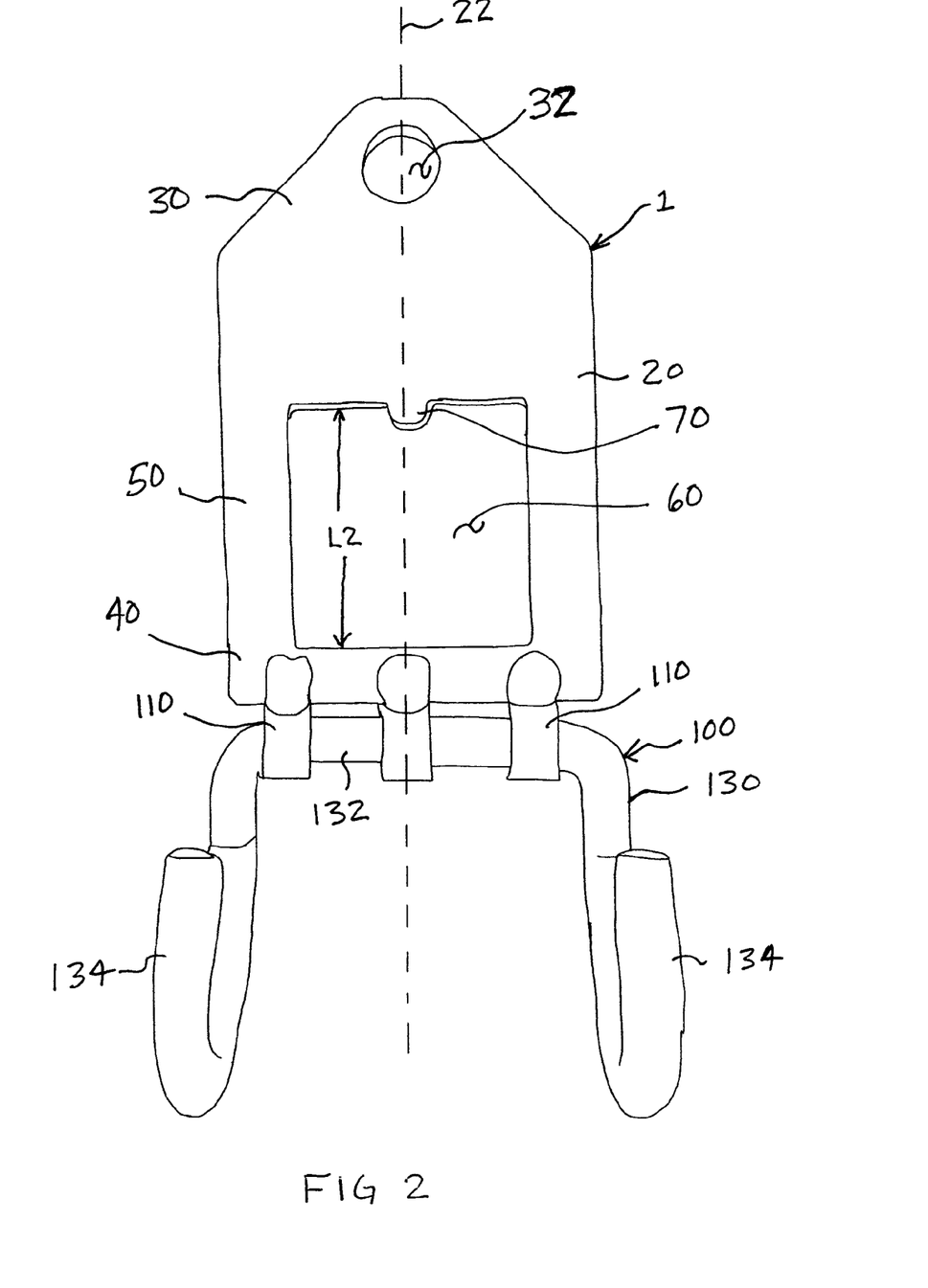
FIG. 2 is a front plan view of the connection plate of FIG. 1
Figure 3:
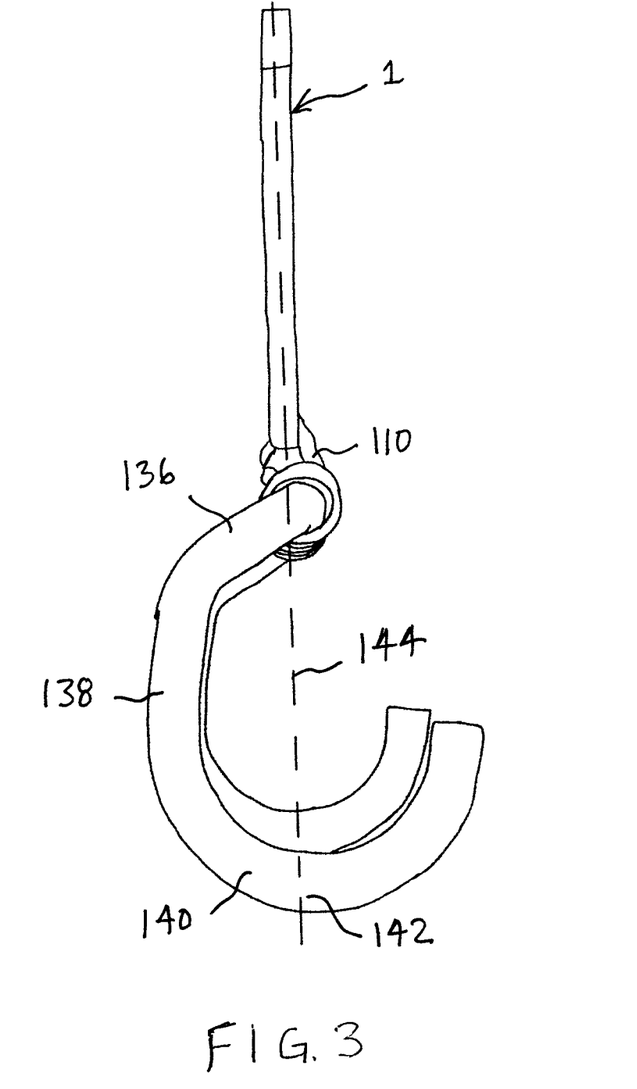
FIG. 3 is a side plan view of the connection plate of FIG. 1

As best shown in FIG. 2 the lock tab 70 of the connection plate 20 is preferably located along a longitudinal center line 22 of the connection plate 20. Similarly, the cable opening 32 is also located along the longitudinal center line 22 of the connection plate 20.

Figure 1:
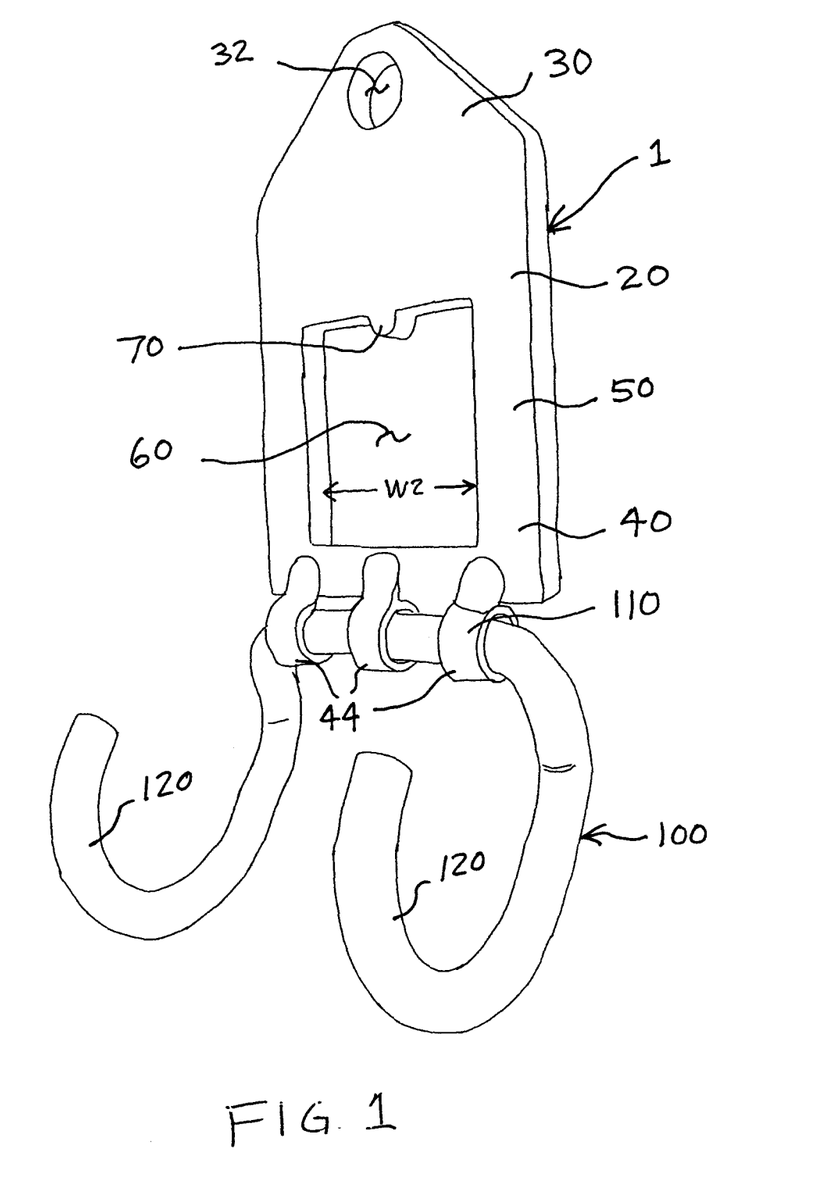
FIG. 1 is a perspective view of the connection plate of the present invention with optional hooks attached.

As shown in FIGS. 1 and 2, the central opening 60 has a width W2 and a length L2. Preferably, the central opening 60 has an L2 dimension which is 0.4 cm longer in a longitudinal direction than the width of the square upright member 6 over which the central opening 60 is to be placed.

As best shown in FIG. 2, the connection plate 20 according to the present invention is generally rectangular and said first end 30 is generally triangular. Said cable opening 32 is located in the triangular first end 30. The central opening 60 is generally square but technically rectangular with a length dimension L2 slightly larger than a width dimension W2 for use on a vertical upright member 6 having a square cross sectional configuration on each side of the square cross sectional configuration of said vertical upright member 6 having a width dimension slightly smaller than W2.

Figure 9:
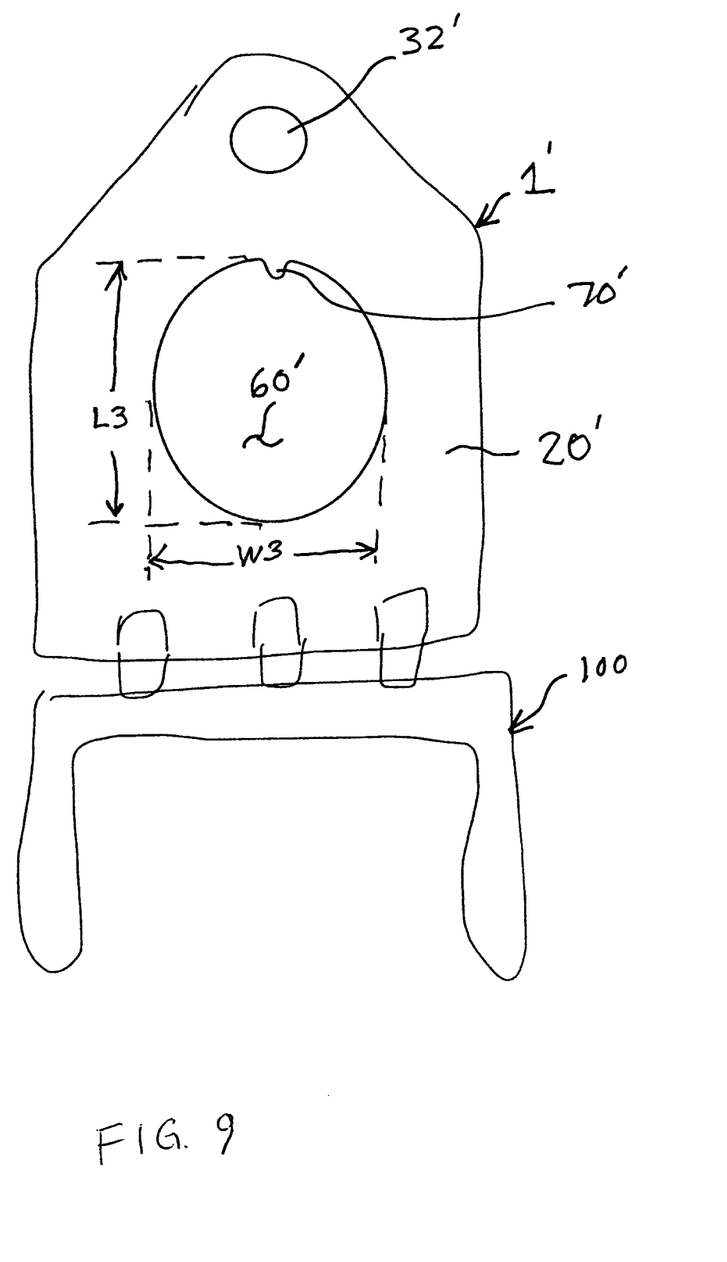
FIG. 9 is a front plan view of a modified connection plate for use on a vertical upright member having a circular cross-sectional configuration.

Referring to FIG. 9, a different embodiment of the present invention is shown which provides a connection 1' which has a connection plate 20' into which a central opening 60' is provided. A lock tab 70' extends into the central opening 60'. A cable opening 32' is also provided. In FIG. 9 the central opening 60' is generally circular but technically ovoid with a length dimension L3 which is slightly longer than a width dimension W3. This configuration is designed for a use on a vertical upright member (not shown) having a circular cross sectional configuration wherein the diameter of said circular cross sectional vertical upright member would have a dimension slightly less than W3.

Figure 6:
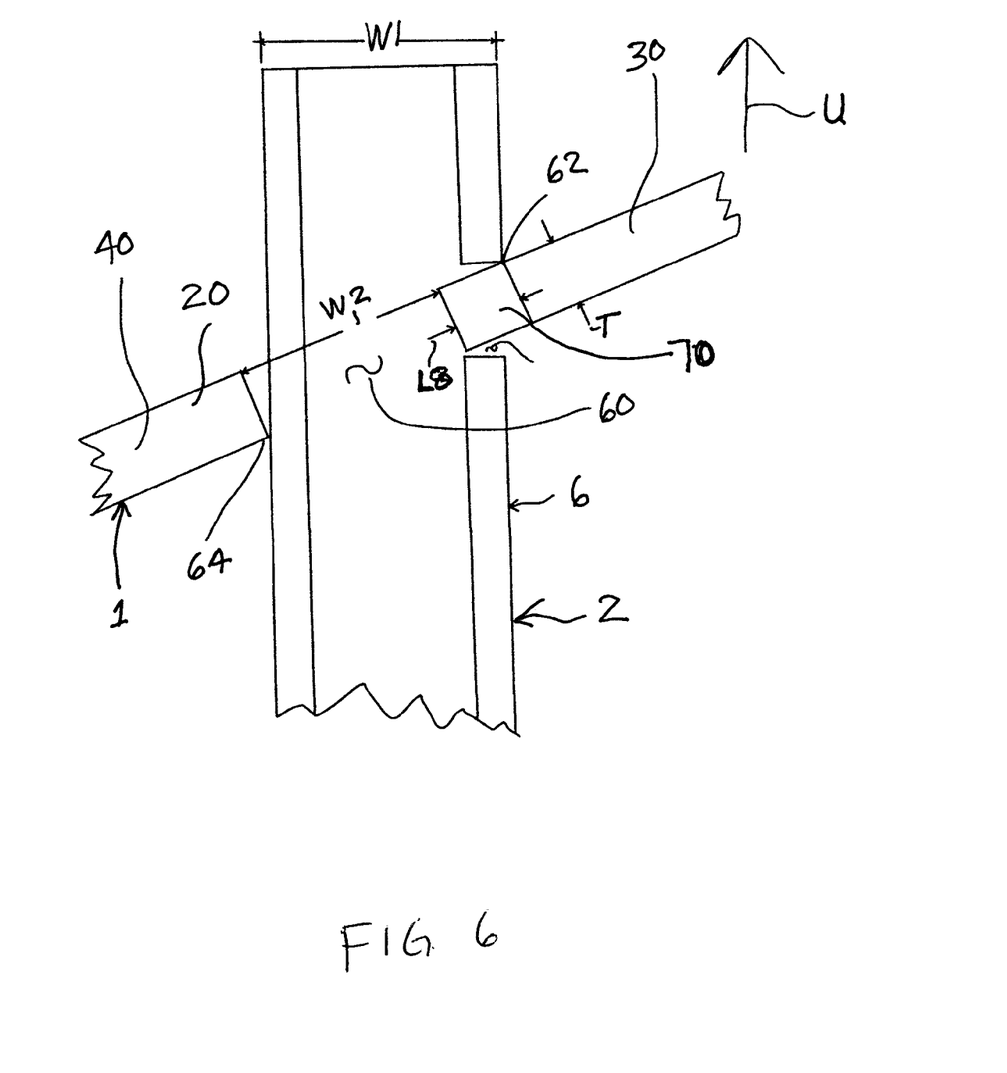
FIG. 6 is a cross sectional view of the connection plate as engaged with the vertical upright member of a weight plate holder.

As shown in FIG. 6, it can be seen that when the first end 30 of connection plate 20 is pulled upwardly in the direction of the arrow U, the connection plate 20 applies torque and creates friction on the edges 62 and 64 of said central opening 60 which aid in securing the connection plate 20 onto said vertical upright member 6 of said weight plate holder 2.

Figure 4:
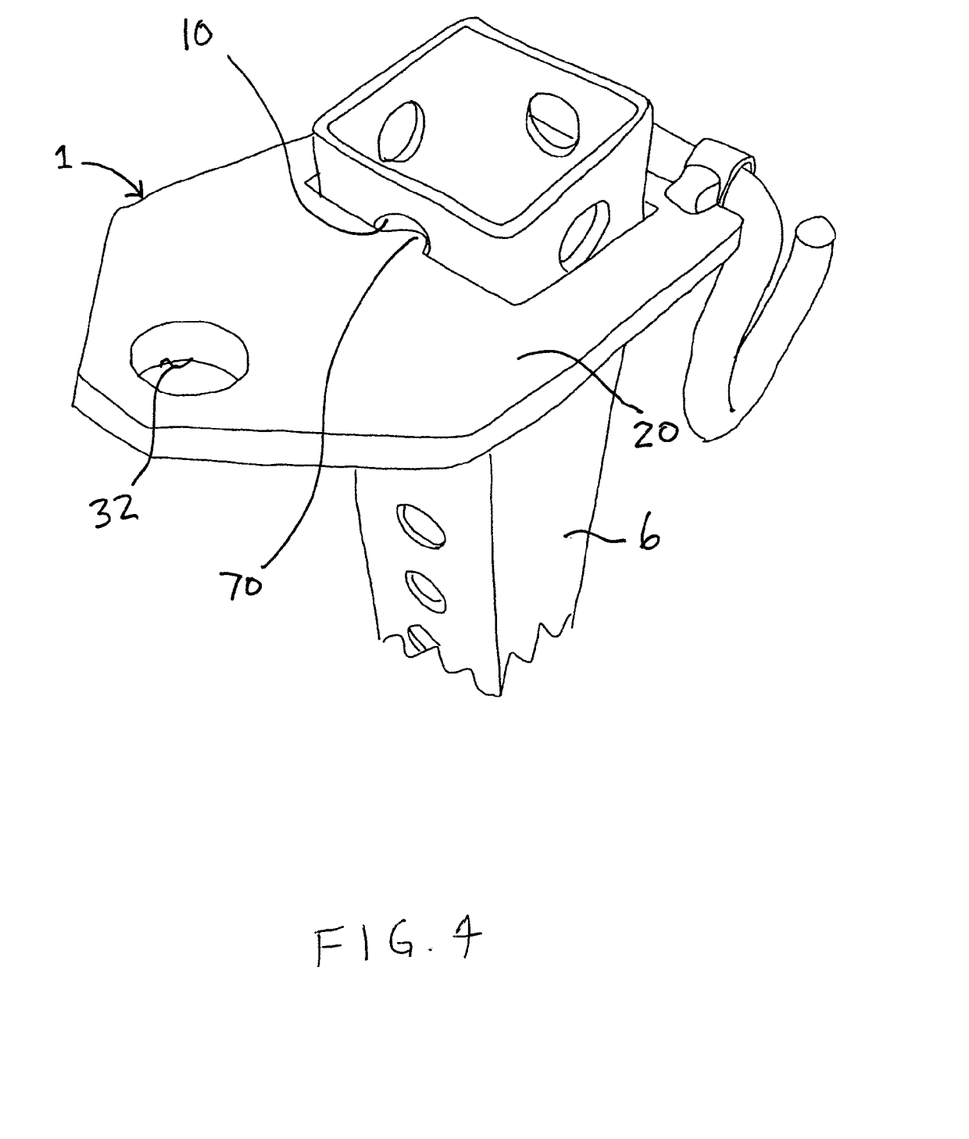
FIG. 4 is a perspective view of the connection plate of FIG. 1 as attached to a vertical upright member of a weigh plate holder.
Figure 5:
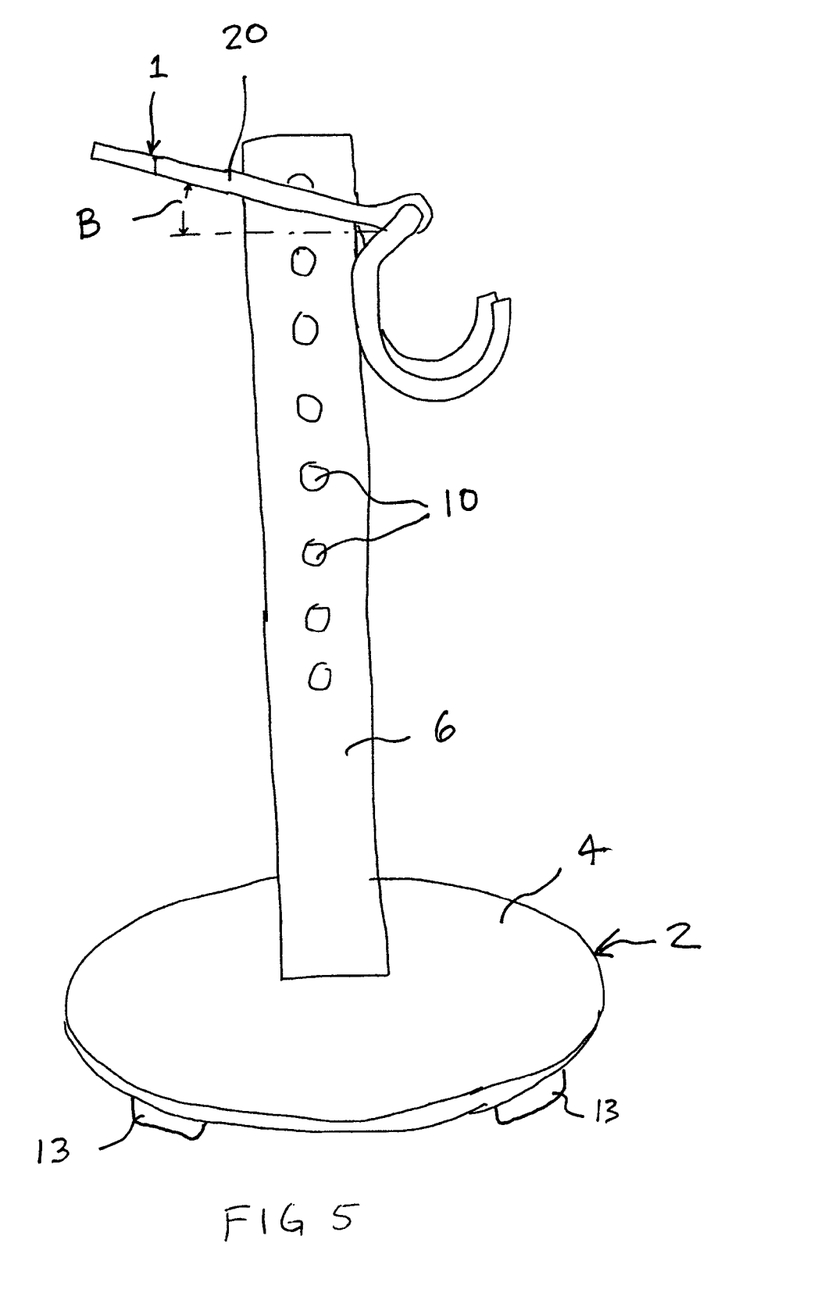
FIG. 5 is a side plan view of the connection plate of FIG. 1 as attached to a vertical upright member of a weigh plate holder.

As best shown in FIGS. 4 and 5, when said connection plate 20 is positioned at an angle B of approximately 20 degrees from a horizontal orientation, the connection plate 20 is then in a tilted locked position and can be utilized to lift the weight plate holder 2 by means of a cable 34 attached to the cable opening 32. In a preferred form of the invention, the connection plate 20 has a length of about 10 cm, a width of about 6 cm and thickness of about 0.6 cm.

In a preferred embodiment of the invention, the connection plate 20 has a generally square central opening 60 having a width dimension W2 of about 4.0 cm and having a length dimension L2 of approximately 4.1 cm. The lock tab 70 which has a length L8 of approximately 0.3 cm for use on a vertical upright member 6 having outer cross sectional dimensions of about 3.7 cm by 3.7 cm.

In a preferred embodiment of the invention, the connector 1 of the present invention also provides a dumbbell holder 100 (See FIG. 8) for a dumbbell 102 having a central bar 50 wherein the connector 1 further comprises said second end 40 of the connection plate 20 having a hook connector 110 thereon and spaced apart hooks 120 pivotally mounted to said hook connector 110 whereby said hooks 120 will wrap around and hold a central bar 50 of a dumbbell 102 to allow the hooks 102 to lift said dumbbell 102 by lifting a cable 34 attached to said cable opening 32.

Figure 8:
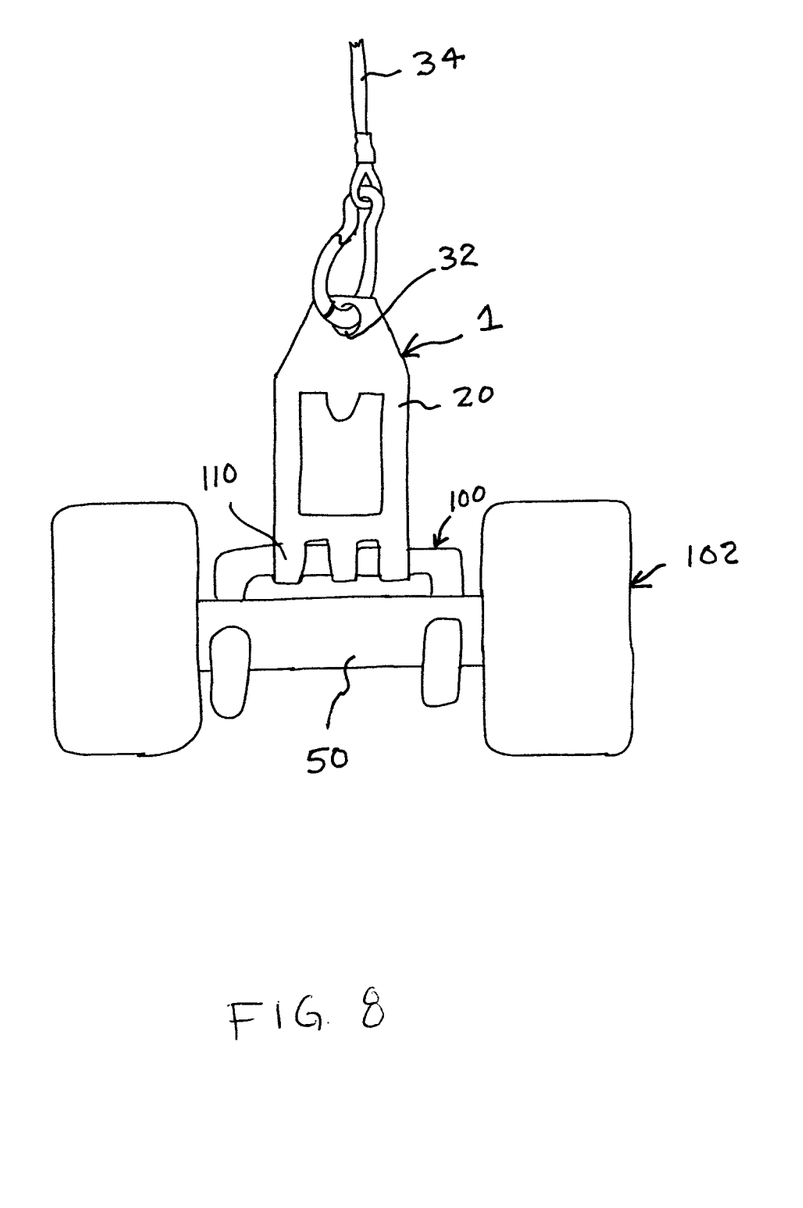
FIG. 8 is a front plan view of the connection plate of FIG. 1 as in use as a connector for a dumbbell.

Preferably, the spaced apart hooks 120 are provided on a single lifting hook member 130. The lifting hook member 130 has a central portion 132 and a pair of hooks 134 with one hook 134 attached at each opposite end of said central portion 132. Each hook 134 has an angled portion 136 extending inwardly toward a back side of said connection plate 20. A downwardly extending portion 138 and an arcuate portion 140 having an approximate midpoint 142 positioned on a line of pull 144 are also provided whereby a bar 150 positioned on said pair of hooks 134 will remain at the approximate midpoint 142 of said arcuate portions 140 and lifted by said pair of hooks 134. In this regard, the preferred single hook device utilized in connection with the present invention is preferably identical to that same hook member as described and shown in FIGS. 5, 6 and 7 of applicant's U.S. Pat. No. 7,008,355 issued Mar. 7, 2006 which patent is hereby incorporated herein by reference thereto.

Preferably the hook connector 110 further comprises plural rings 44 attached to said second end 40 of said connection plate 20 through which a central portion 132 of said single hook member 130 passes allowing pivotal rotation of hook ends 134 of said single lifting hook 130.

As shown in FIGS. 1, 2, 7 and 8, preferably the connector 1 has three spaced apart rings 44 which allow the pivotal connection of the single hook member 130. It is to be understood, however, that any type of hinged connection which allows a pivotal motion of a pair of hooks would serve this purpose.

Figure 7:
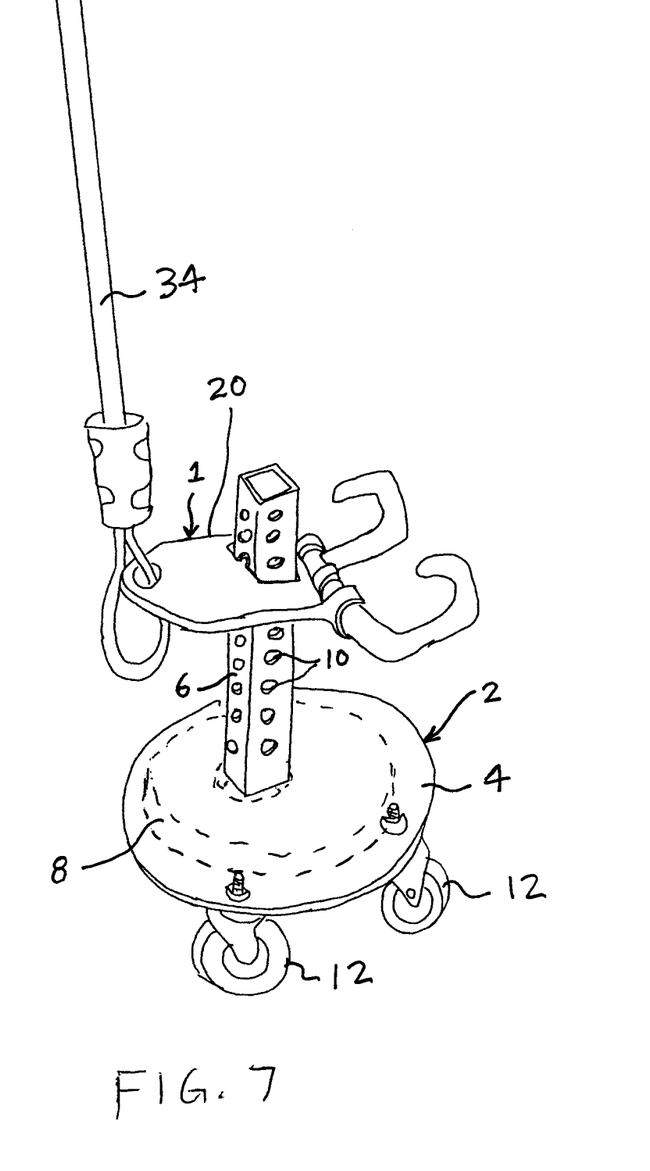
FIG. 7 is a perspective view of the connection plate of FIG. 1 as in use as a connector for a weight plate holder.

In use, as shown in FIG. 7, the weight plate holder 2 preferably has wheels 12 thereon so as to allow it to be easily rolled into a desired location on the gym floor. Alternatively, the weight plate holder may have rubberized feet 13 as shown in FIG. 5, such as push in rubber bumpers. The weight plate holder 2 may contain one or more weight plates 8 to provide the desire resistance. The user may wish to rapidly connect to various different weight plate holders 2 each of which have a different load so as to allow a quick increase in resistance for additional repetitions of the exercise. When this is desired, the connection plate 20 merely needs to be placed in a horizontal orientation and simply slid upwardly over the vertical upright member 6 of the weight plate holder 2. The connection plate 20 can then be easily slid over the vertical upright member 6 of an additional weight plate 2 which has more weight by holding it horizontally sliding it downwardly over the top of the vertical upright 6 and simply lifting upwardly with the cable 34 causing the lock tab 70 to pull the first end 30 of the connection plate 20 upwardly locking into position as shown FIGS. 4, 5, 6 and 7. As shown in FIG. 8, the connection of a cable 34 to the connection plate 20 can be accomplished by any desired type of snap hook or other rapid connector to connect the steel cable, chain, or nylon strap to the cable opening 32.

It is to be understood that while certain forms of the present invention have been illustrated and described herein, the present invention is not to be limited to the specific forms or arrangements of parts described and shown.

I claim:

1. A connector for a weight plate holder of the type having a weight plate base and attached vertical upright member upon which weight plates can be stacked, said vertical upright member having at least one hole therein comprising: a connection plate, said connection plate having a first end, a second end and a middle portion between said first end and said second end, said first end having a cable opening therein to allow the connection of a cable thereto, said middle portion having a central opening therein sized larger than said vertical upright member, said middle portion also having a lock tab protruding partially into said central opening, said connection plate configured to slide over and onto said vertical upright member when said connection plate is in a horizontal orientation and when said first end of said connection plate is tipped upwardly away from a horizontal orientation said lock tab enters said at least one hole wherein pulling upwardly on said first end keeps said lock tab firmly held in said at least one hole allowing the connection plate and attached weight plate holder to be lifted by the cable attached through said cable opening.

2. A connector according to claim 1 wherein said lock tab is located along a longitudinal centerline of the connection plate.

3. A connector according to claim 1 wherein said cable opening in located along a longitudinal centerline of the connection plate.

4. A connector according to claim 1 wherein said opening is 0.4 cm. longer in longitudinal direction than a side of a square vertical upright member.

5. A connector according to claim 1 wherein said connection plate is generally rectangular and said first end is generally triangular with said cable opening located in the triangular first end.

6. A connector according to claim 1 wherein said central opening is generally square but technically rectangular with a length dimension slightly larger the width dimension for use on vertical upright member having a square cross sectional configuration.

7. A connector according to claim 1 wherein said central opening is generally circular but technically ovoid with a length dimension slightly larger the width dimension for use on vertical upright member having a circular cross sectional configuration.

8. A connector according to claim 1 whereby pulling upwardly on said first end of said connection plate applies torque and creates friction on edges of said central opening of said connection plate which aid in securing the connection plate onto said upright member of said weight plate holder.

9. A connector according to claim 1 wherein said connection plate is positioned at an angle B of approximately 20 degrees from a horizontal orientation when in a tilted locked position.

10. A connector according to claim 1 wherein said connection plate has a length of about 10 cm. a width of about 6 cm. and a thickness of about 0.6 cm.

11. A connector according to claim 1 wherein said connection plate has a generally square central opening of about 4.0 cm. by 4.1 cm with a lock tab which has a length of about 0.3 cm. for use of a vertical upright member having outer dimensions of about 3.7 cm by 3.7 cm.

12. A connector according to claim 1 also providing a dumbbell holder for a dumbbell having a central bar wherein the weight plate holder further comprising: said second end having a hook connector thereon; and spaced apart hooks pivotally mounted to said hook connector whereby said hooks will wrap around and hold a central bar of a dumbbell to allow the hooks to lift said dumbbell by lifting a cable attached to said cable opening.

13. A connector according to claim 12 wherein said spaced apart hooks are provided on a single lifting hook member, said lifting hook member having a central portion and a pair of hooks, with one hook attached at each opposite end of said central portion, each hook having an angled portion extending inwardly toward a back side of said connection plate, a downwardly extending portion, and an arcuate portion having an approximate midpoint positioned on a line of pull, whereby a bar positioned on said pair of hooks will remain at the approximate midpoint of said arcuate portions when lifted by said pair of hooks.

14. A connector according to claim 13 wherein said hook connection further comprises plural rings attached to said second end of said connection plate through which a central portion of single hook passes allowing pivotal rotation of hook ends of said single lifting hook.

15. A connector according to claim 1 wherein said weight plate base has wheels.

* * * * *